US009882826B2

(12) United States Patent
Fall et al.

(10) Patent No.: US 9,882,826 B2
(45) Date of Patent: *Jan. 30, 2018

(54) SOFTWARE DEFINED INFRASTRUCTURES THAT ENCAPSULATE PHYSICAL SERVER RESOURCES INTO LOGICAL RESOURCE POOLS

(71) Applicant: International Business Machines Corporation, Armonk, NY (US)

(72) Inventors: James J. Fall, Pine Island, MN (US); Tammy L. Van Hove, Elgin, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/199,950

(22) Filed: Jun. 30, 2016

(65) Prior Publication Data
US 2016/0315828 A1   Oct. 27, 2016

Related U.S. Application Data

(63) Continuation of application No. 14/206,038, filed on Mar. 12, 2014, now Pat. No. 9,432,267.

(51) Int. Cl.
*G06F 15/173* (2006.01)
*H04L 12/911* (2013.01)
(Continued)

(52) U.S. Cl.
CPC ............... *H04L 47/70* (2013.01); *G06F 8/60* (2013.01); *G06F 9/44505* (2013.01); *G06F 9/50* (2013.01); *H04L 12/4633* (2013.01); *H04L 41/12* (2013.01); *H04L 41/20* (2013.01); *H04L 41/22* (2013.01); *G06F 9/45533* (2013.01); *G06F 9/45558* (2013.01); *G06F 11/203* (2013.01); *G06F 2009/45583* (2013.01)

(58) Field of Classification Search
CPC .......................... G06F 9/45558; G06F 11/203
See application file for complete search history.

(56) References Cited

U.S. PATENT DOCUMENTS 8,046,767 B2   10/2011   Rolia et al.
8,185,907 B2   5/2012   Gusler et al.
(Continued)

OTHER PUBLICATIONS

Waxman, Jason; "Architecting Cloud Infrastructure for the Future", Intel Corporation, Data Center and Connected System Group, Jul. 22, 2013, pp. 1-34.
(Continued)

*Primary Examiner* — Hieu Hoang
(74) *Attorney, Agent, or Firm* — Martin & Associates, LLC; Bret J. Petersen

(57) ABSTRACT

A software defined infrastructure (SDI) makes available a subset of a computer server's resources to a cloud solution or workload. Multiple subsets of resources can be combined in a SDI to provide a logical resource pool. This allows cloud administrators to create software defined infrastructures derived from the partial capacity of a collection of systems. The resources defined across the physical boundaries of a computer server can then be made available to host deployment of cloud workloads. The infrastructure resource pool can be selected upon deployment of a cloud workload.

16 Claims, 7 Drawing Sheets

(51) Int. Cl.
*H04L 12/24* (2006.01)
*G06F 9/445* (2006.01)
*G06F 9/50* (2006.01)
*H04L 12/46* (2006.01)
*G06F 9/455* (2006.01)
*G06F 11/20* (2006.01)

(56) References Cited

U.S. PATENT DOCUMENTS

| | | | |
|---|---|---|---|
| 8,458,334 | B2 | 6/2013 | Sukthankar et al. |
| 8,458,713 | B2 | 6/2013 | Flores et al. |
| 2010/0312893 | A1 | 12/2010 | Watanabe et al. |
| 2011/0004732 | A1 | 1/2011 | Krakirian et al. |
| 2012/0096165 | A1 | 4/2012 | Madduri et al. |
| 2012/0159481 | A1 | 6/2012 | Anderson et al. |
| 2012/0246517 | A1 | 9/2012 | Bender et al. |
| 2012/0331114 | A1 | 12/2012 | Garg et al. |
| 2013/0042003 | A1 | 2/2013 | Franco et al. |
| 2013/0054808 | A1 | 2/2013 | Hildebrand et al. |
| 2013/0174149 | A1 | 7/2013 | Dasgupta et al. |
| 2013/0215215 | A1 | 8/2013 | Gage et al. |
| 2013/0227116 | A1 | 8/2013 | Radhakrishnan |
| 2013/0346972 | A1* | 12/2013 | Anand .............. G06F 9/45558 718/1 |
| 2014/0351443 | A1 | 11/2014 | Tang et al. |

OTHER PUBLICATIONS ip.com et al.; "Workload Contract Mechanism to Support Diverse Workload Types Dynamically on Cloud Platform", IPCOM000226489D, Apr. 8, 2013, pp. 1-14.

Shimonishi et al.; "Virtualized Network Infrastructure Using OpenFlow", IFIP/IEEE Network Operations and Management Symposium Workshops, Apr. 19-23, 2010, pp. 74-79.

Xiao et al., "Dynamic Resource Allocation Using Virtual Machines for Cloud Computing Environment", IEEE Transactions on Parallel and Distributed Systems, vol. 24, No. 6, Jun. 2013, pp. 1107-1117.

IBM System z Capacity Offering for Cloud, Sep. 5, 2013.

* cited by examiner

SOFTWARE DEFINED INFRASTRUCTURES THAT ENCAPSULATE PHYSICAL SERVER RESOURCES INTO LOGICAL RESOURCE POOLS

BACKGROUND

1. Technical Field

This invention generally relates to allocation of resources in a networked computer system, and more specifically relates to software defined infrastructures that encapsulate physical server resources into logical resource pools to share the resources of the physical server across multiple cloud solutions or workloads.

2. Background Art

Cloud computing is a common expression for distributed computing over a network. Cloud computing is commonly used to refer to network-based services which appear to be provided by real server hardware but are provided by virtual hardware or virtual machines (VMs). The virtual machines are simulated by software running on one or more real machines. The virtual machines do not physically exist and can therefore be deployed where needed and dynamically scaled without affecting the end user.

Software Defined Environment (SDE) is a term introduced by International Business Machine Corporation (IBM). SDE is part of its "software defined everything" vision. An SDE can be used to control the entire computing infrastructure including compute resources, storage and network resources to the type of work required. By dynamically assigning workloads to resources based on a variety of factors, including the characteristics of specific applications, the available resources, and service-level policies, a software-defined environment can deliver continuous, dynamic optimization and reconfiguration to address infrastructure issues.

BRIEF SUMMARY

An apparatus and method for a software defined infrastructure (SDI) that makes available a subset of a computer server's resources to a cloud solution or workload. Multiple subsets of resources can be combined in a SDI to provide a logical resource pool. This allows cloud administrators to create software defined infrastructure derived from the partial capacity of a collection of systems. The resources defined across the physical boundaries of a computer server can then be made available to host deployment of cloud workloads across multiple different clouds. The infrastructure resource pool can be selected upon deployment of a cloud workload. This selection may be driven by policies governing the placement of the workload by matching the workload to the features provided by the resource pools making up the software defined infrastructure.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
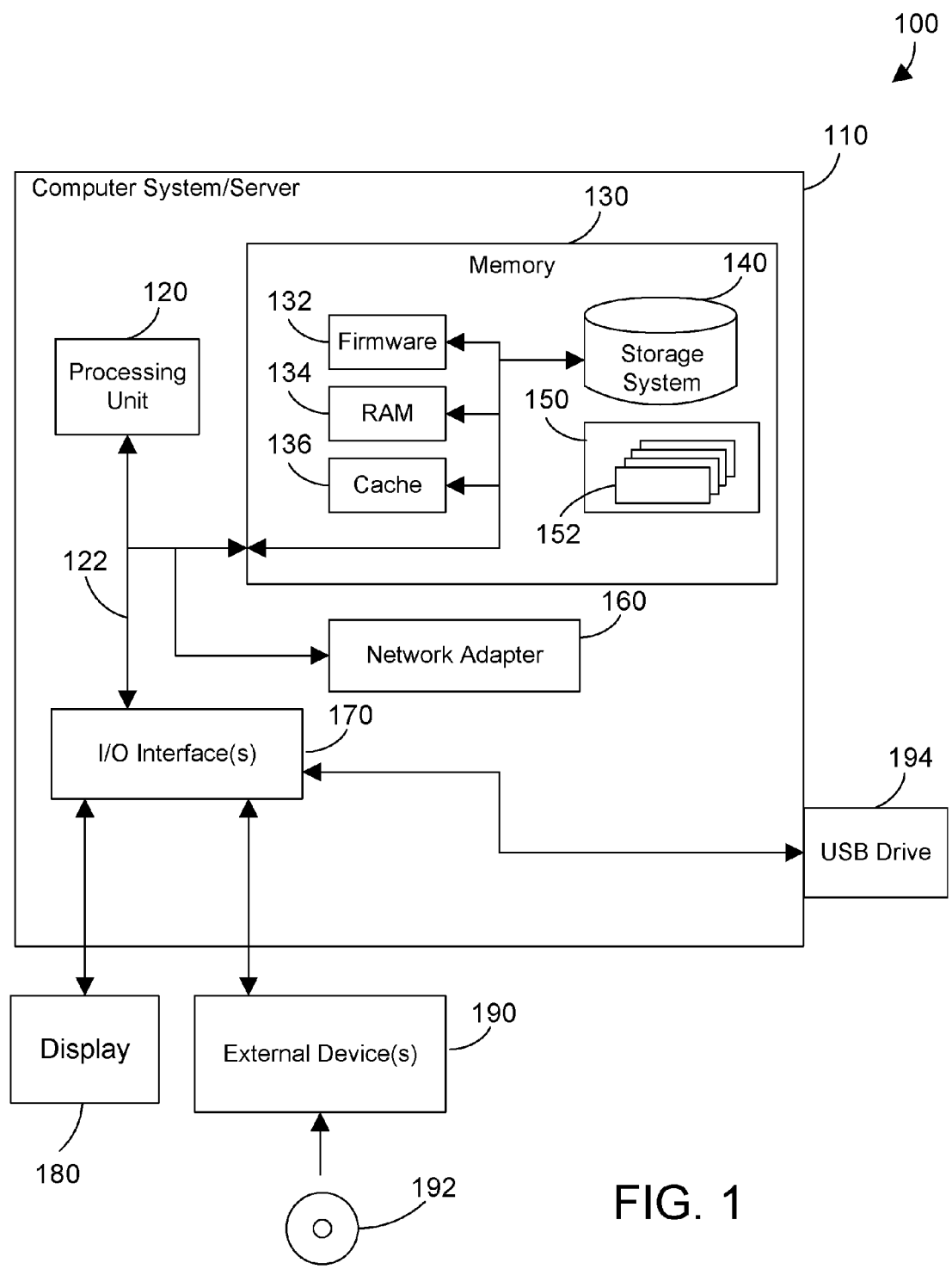
FIG. 1 is a block diagram of a cloud computing node.

Prior art systems typically require that the full capacity of a physical server's resources be configured and available to a single cloud solution. Under-utilization of available compute resources may occur where the full set of a physical server's resources are dedicated to a given infrastructure deployment for cloud workloads. Users of virtualized high end power systems are particularly unable to efficiently utilize the available capacity of a physical server in multiple cloud instances. A power system is a computer system having a significantly large computing capability. In such systems it is desirable to share the computing capability with multiple VMs. Power systems clients would prefer to dedicate only part of a physical system's resources to a given cloud deployment and/or to a given type of workload which is not supported in prior art systems.

The claims and disclosure herein provide mechanisms and methods for a software defined infrastructure (SDI) that makes a subset of a computer server's resources available to a cloud solution or workload. Multiple subsets of resources can be combined in a SDI to provide a logical resource pool. This allows cloud administrators to create software defined infrastructure for use in software defined environments derived from the partial capacity of a collection of systems. The resources defined across the physical boundaries of a computer server can then be made available to host deployment of cloud workloads. The infrastructure resource pool can be dynamically selected upon deployment of a cloud workload. This selection is driven by policies governing the placement of the workload—matching the workload to the features provided by the resource pools making up the software defined infrastructure.

As used herein, a software defined infrastructure (SDI) is specific example of a software defined environment in a data center environment. The SDI provides a virtualization of resources such as virtual input/output servers (VIOS). As used herein, a hypervisor manages the virtualization of the server's resources, meaning it manages an environment where multiple virtual machines are hosted on a single physical computer system. The hypervisor is responsible for allocating and managing resources (e.g. memory and processor) across multiple virtual machines running on a given power server/system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 194.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
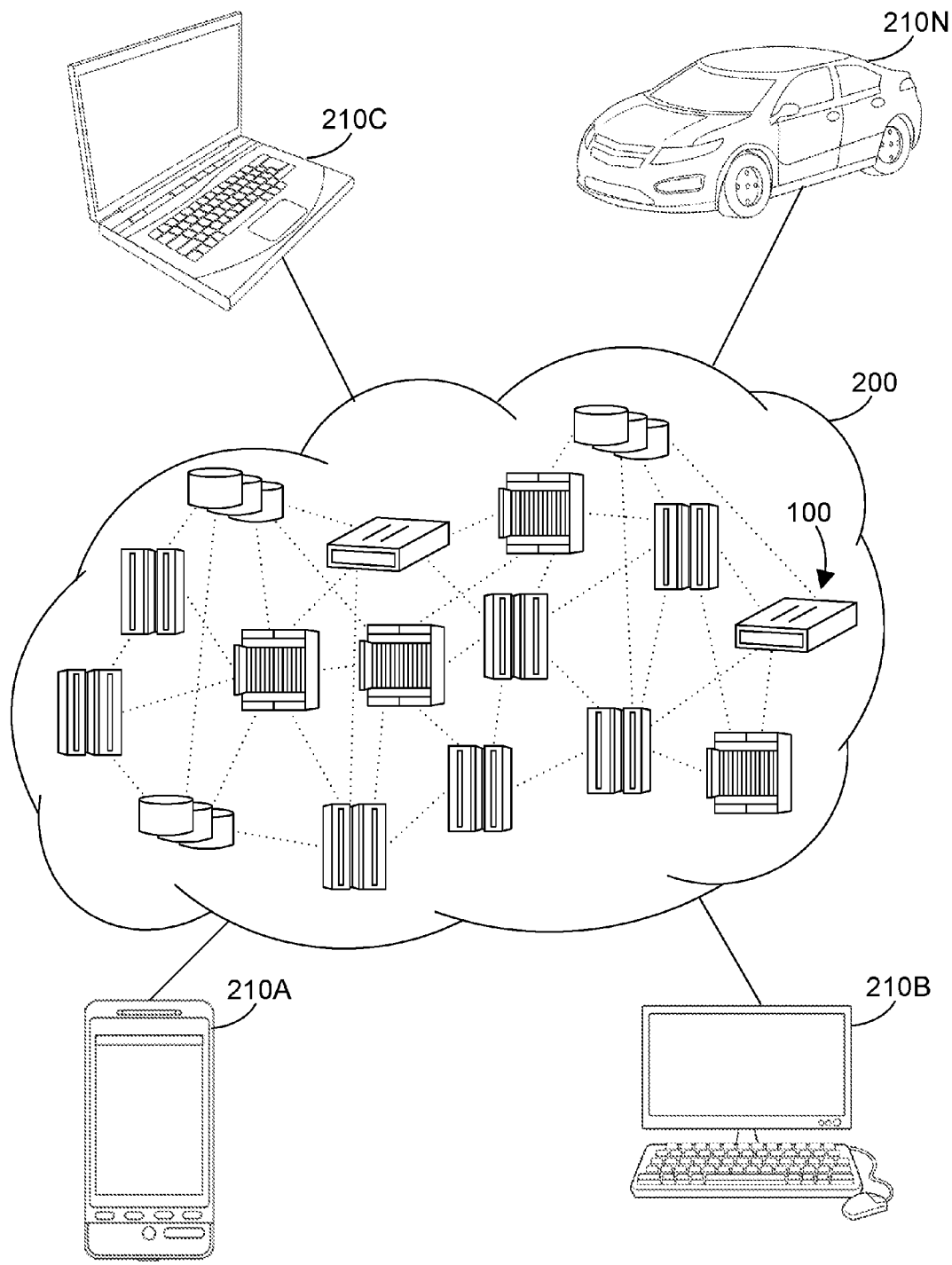
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
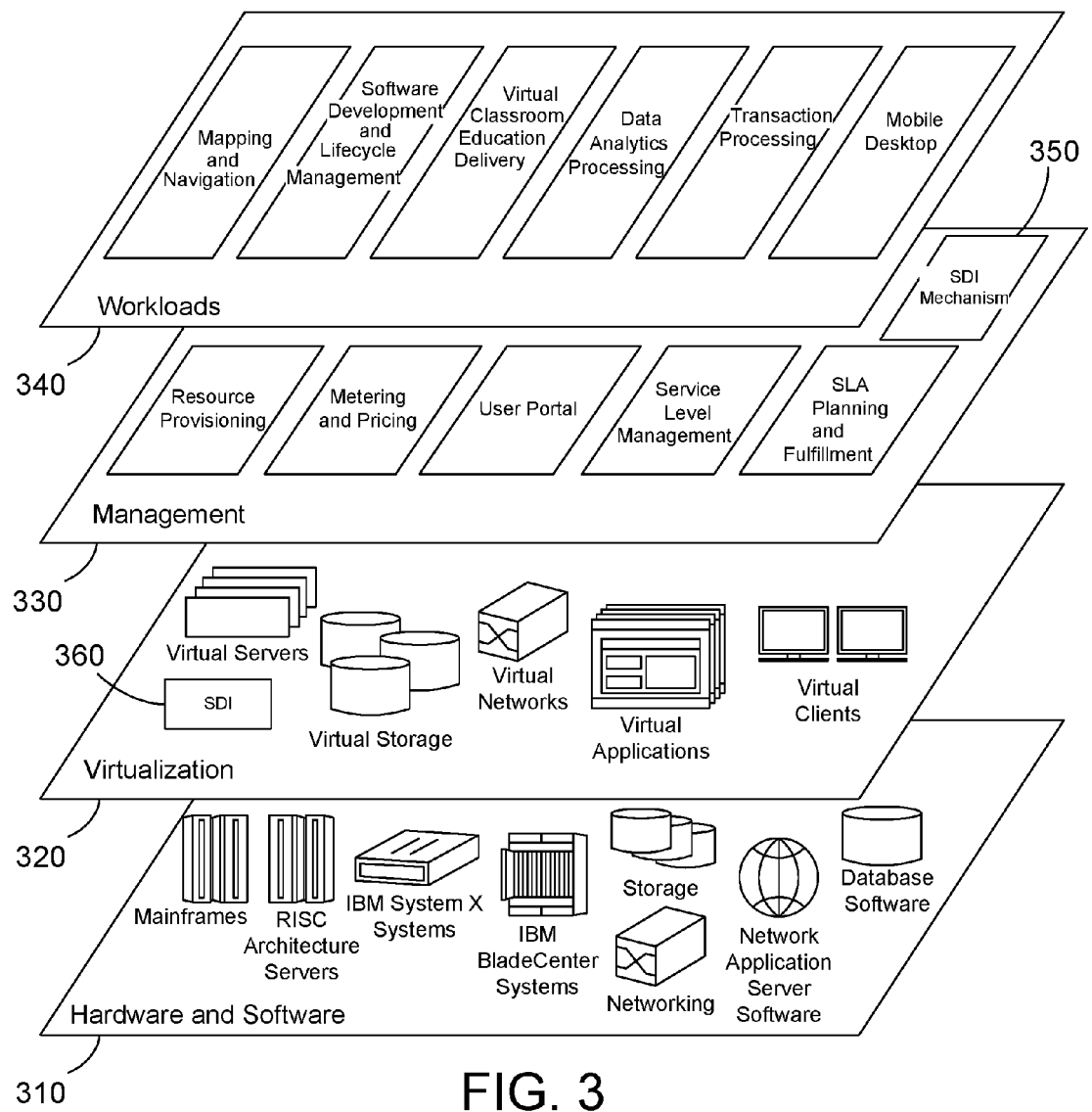
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients. The virtualization layer further includes a software defined infrastructure (SDI) 360. The SDI is described in further detail below.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer further includes a software defined infrastructure mechanism (SDIM) 350 as described herein. While the SDIM 350 is shown in FIG. 3 to reside in the management layer 330, the SDI 350 actually may span other layers shown in FIG. 3 as needed.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The software defined infrastructure (SDI) as used herein is a grouping or pool of resource objects from one or more physical servers and their virtualized environments. One or more subsets of resources are grouped together in the SDI to provide a logical resource pool. An example of a resource object is a virtual I/O server (VIOS). A physical machine may have more than one VIOS to achieve high availability. If one VIOS on a physical server fails the VMs still have access to their I/O via a second VIOS (this is called multi-path I/O). In addition, if there are a high number of VMs on a given physical server, the system can load balance the I/O serving across multiple VIOSs. High performance systems may have 4, 6 or 8 VIOS per physical system.

An SDI could be a group or pool of VIOSs or a pool of software license entitlements (described further below with reference to FIG. 6) that are required to run a given cloud workload. An SDI with a VIOS pool is composed of all the VMs and workloads that are receiving I/O from one or more VIOS in the pool. For example, a physical server may have two VIOS pools, a "production" VIOS and a "development" VIOS. Each VIOS pool owns a set of physical I/O adapters for storage and network and in turn serves virtual I/O to the respective set of workloads in that SDI (prod and dev). The SDI allows cloud administrators to create software defined infrastructure derived from the partial capacity of one or more systems. The resources defined across the physical boundaries of a compute server can then be made available to host deployment of cloud workloads.

As introduced above with reference to FIG. 3, the virtualization layer includes a software defined infrastructure (SDI) 360. Further, the management layer includes a software defined infrastructure mechanism (SDIM) 350 that resides in the management layer 330 or may also reside in the other layers shown in FIG. 3. The SDIM 350 sets up the SDI 360 on the virtualization layer to provide a subset of a computer server's resources in the hardware layer 310. The SDI, a virtual resource can then be provisioned to a cloud solution or workload in the workloads layer 340. The workload will then see the portion of resources of the SDI as if it were a complete resource. This allows the encapsulated portion of resources in the SDI to be used by the workload in a traditional manner but more efficiently utilize the hardware resource by being able to divide it up to multiple SDIs that may be used by multiple workloads.

Figure 4:
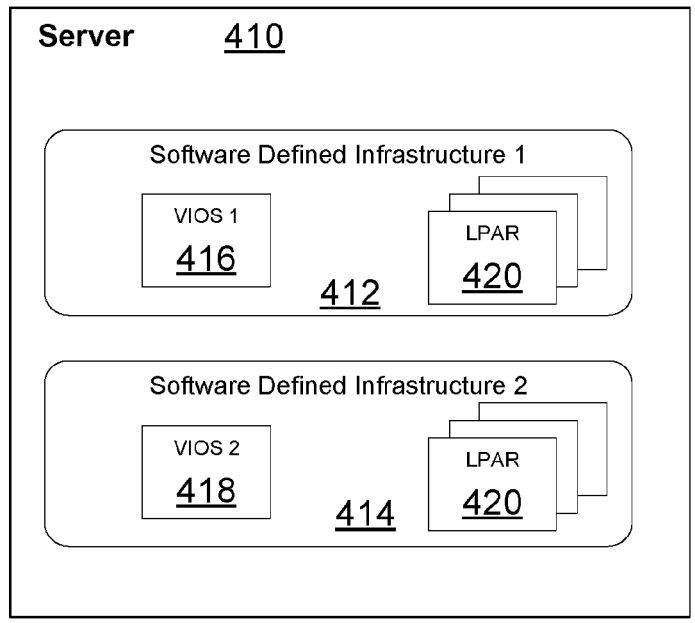
FIG. 4 is a block diagram of an example physical server with the server's resources divided into two software defined infrastructures as described herein.

FIG. 4 is a block diagram that illustrates a physical server with the server's resources divided into software defined infrastructures (SDIs) as claimed herein. In this example, the resources of the physical server 410 are divided into SDI1 412 and SDI2 414. In this example, the software defined infrastructures are each supported by a single virtual input/output server (VIOS), SDI1 412 has a VIOS1 416, Similarly, SDI2 414 has a VIOS2 418. FIG. 4 illustrates a very simplified example. It is understood that in practice the physical server could be divided into any number of SDIs and have any number of virtual I/O servers. When client workloads are provisioned into the SDI as described below, the client workloads may be provisioned into one or more logical partitions (LPARs) 420 in the SDI as shown. Dynamic LPARs may also be used in the SDI. Dynamic LPARS may be used to dynamically adjust the VM resources to meet a Service Level Agreement (SLA).

Figure 5:
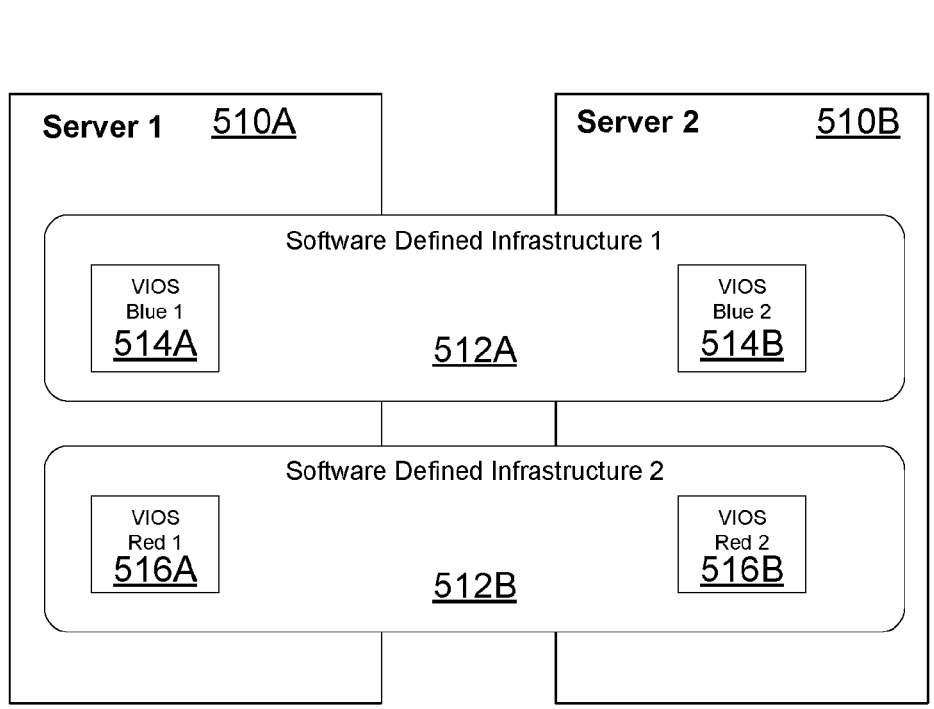
FIG. 5 is a block diagram with the resources of two physical servers divided and shared into two software defined infrastructures as described herein.

FIG. 5 is a block diagram that illustrates two physical servers with each of the server's resources divided into software defined infrastructures (SDIs) as claimed herein. In this example, the resources of the physical servers 510A, 510B are divided into SDI1 512A and SDI2 512B. In this example, the software defined infrastructures 510A, 510B are each supported by two virtual input/output servers (VMS). SDI1 512A has VIOS Blue1 514A and VIOS Blue2 5141. Similarly SDI2 512B has VIOS Red1 516A and VIOS Red2 516B.

Figure 6:
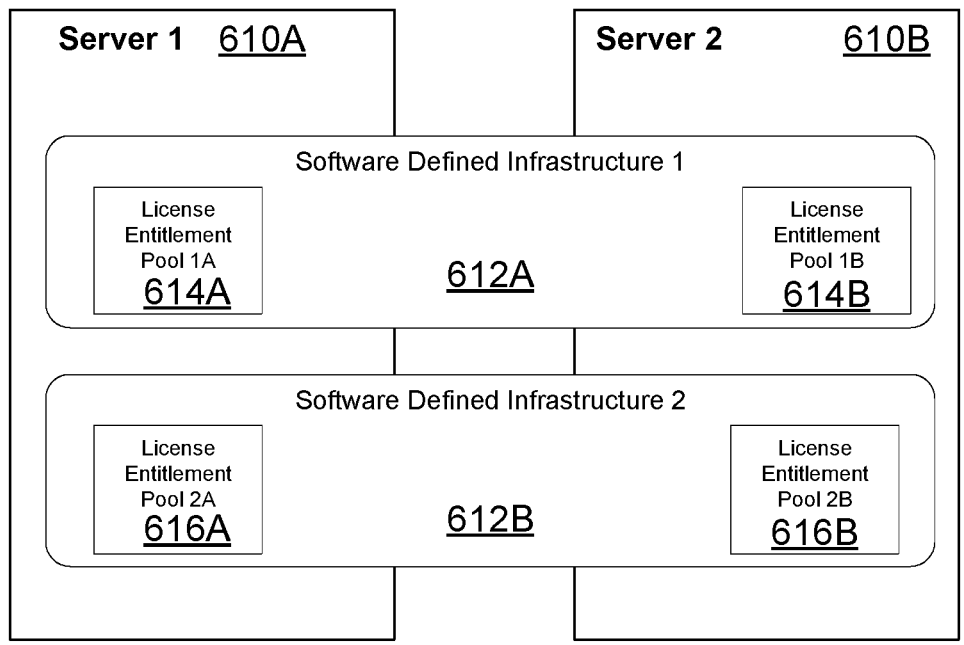
FIG. 6 is another block diagram with the resources of two physical servers divided and shared into or among two software defined infrastructures as described herein.

FIG. 6 is a block diagram that illustrates another example of two physical servers with each of the server's resources divided into software defined infrastructures (SDIs). In this example, the resources of the physical servers 610A, 610B are divided into SDI1 612A and SDI2 612B. In this example, the software defined infrastructures 612A, 612B are each supported by two license entitlement pools (LEP). The license entitlement pool is a group or pool of physical resources that are available to a customer or user under license from a vendor. For example, the LEP contains processor and memory resources in a cloud server available to the user. Software defined environments can be created as shown with shared processor pools for the purpose of supporting cloud workloads with specific license entitlement in the service level agreements shown in FIG. 3. In FIG. 6 two infrastructures with differing license pool entitlements are defined; both of which span physical server boundaries providing a logical pool of license entitlement. In this example, software defined infrastructure 612A has LEP1A 614A and LEP1B 614B. Similarly, software defined infrastructure 2 612B has LEP2A 616A and LEP2B 616B.

Figure 7:
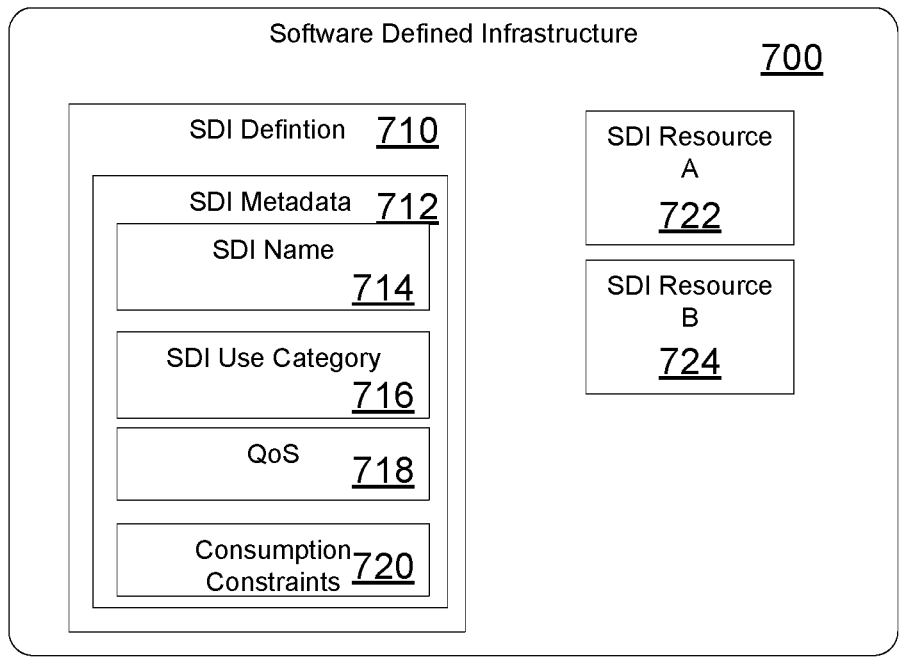
FIG. 7 is a block diagram that illustrates an example of software defined infrastructure.

FIG. 7 is a block diagram that illustrates an example of software defined infrastructure (SDI) 700. The SDI 700 includes a SDI definition 710. The SDI definition 710 includes SDI metadata 712 that is used to define SDI characteristics and parameters. The SDI characteristics and parameters in the SDI metadata 712 can be setup by the system administrator as described below. In this example, the SDI metadata 712 includes a SDI name 714, SDI category 716, quality of service characteristics 718 and consumption constraints 720, The SDI category 716 defines the type of SDI. For example, the SDI category may be production, development or test. The quality of service characteristics 718 may indicate quality parameters such as quality of the storage, availability, performance and network throughput of the resources allocated to the SDI as described further below. The consumption constraints 720 indicate constraints on resources as described further below. The SDI 700 further includes one or more SDI resources, where the SDI resources are virtual references to resources on physical machines as described further below. In this example, the SDI 700 includes SDI resource A 722 and SDI resource B 724. SDI Resource A 722 may represent a VIOS while SDI Resource B 724 may represent a second VIOS or a license entitlement pool as described above.

The quality of service characteristics 718 in FIG. 7 may indicate parameters such as quality of the storage, availability, performance, and network throughput of the resources allocated to the SDI. Examples of quality of service characteristics could include a response time for the VM to an application or other suitable response times. Another example is the number of input/output (I/O) paths available to access the physical resources. The QoS characteristics could include setting a storage area network (SAN) QoS parameter to a minimum or maximum, which indicates the level of enhancement of storage devices available to the SDI using a SAN. The QoS characteristics could also include a parameter for high availability for the system to insure the allocated resource has a desired level of high availability.

The consumption constraints 720 in FIG. 7 indicate constraints on resources such as bandwidth, processors or memory. The consumption constraints 720 place operational limits on individual workloads within the SDI. The SDI mechanism 350 enforces the constraints in conjunction with other system services to accomplish this task. For example, the consumption constraint could include a workload placement constraint that specifies "Do not co-locate two different tenant users" on the same physical server. This could be a security related constraint enforced by the SDI mechanism that calculates workload placement onto physical servers in a given SDI. Constraints could also be general constraints on time and resources. For example, a consumption constraint could be "after 48 hours all dev/test workloads (VMs) expire, are de-provisioned, and the resources consumed by the workload are marked available."

The following information is a simplified example of a first SDI Definition 710 as shown in FIG. 7.
  SDI MetaData:
  SDI Name: Test Environment
  SDI Use Category: Test
  QoS:
    Response time: 1.0 second
    Redundant I/O paths: no
    SAN QoS: Minimum
    VM Availability: High Availability Not Required
  Constraints:
    VM expiration: 48 hours The following information is another simplified example of a SDI Definition 710 as shown in FIG. 7.
  SDI MetaData:
  SDI Name: Production Workloads Cloud
  SDI Use Category: Production
  QoS:
    Response time: 0.1 seconds
    Redundant I/O paths: yes
    SAN QoS: High
    VM Availability: 99.99999%
  Constraints:
    VM expiration: None
    Tenant Users: Do not co-locate There are various tasks involved in creating and managing the SDI. In the illustrated example herein, the SDIM performs these tasks to create and manage the SDI with input from a user or administrator. Other entities could also perform or assist in the management of the SDIs. The tasks include defining the SDI, identifying physical servers and unallocated resources, selecting and allocating the resources, aggregating the SDI resources and then managing and deploying the resources as described further below.

The SDIM initially creates a new SDI by creating a new SDI definition as described above. The SDIM identifies the physical servers that will provide compute resources to the new SDI. This may include administrator input of the physical servers that will back the SDI. The SDIM also identifies the resources that exist on the physical servers selected that are not currently allocated to other workloads or SDIs and are thus candidate resources to be allocated to the new SDI. The SDIM selects the resources from those identified in above that will be allocated to the new SDI. This selection can be either automatically or via administrator input. The SDIM may make recommendations to the administrator to assist the administrator in making the selections. Examples of resource allocations include a subset of processor, memory, I/O, and license entitlement resources from each physical server that will be allocated to the new SDI. Resource selection is repeated for each physical server identified. This selection process allows the administrator to establish a SDI that is allocated only a subset of a given physical server's resources in contrast to the prior art where the entire physical server was required to be allocated to the SDI. The selection of resources can be made upon deployment of the workload. The selection is driven by policies governing the placement of the workload by matching the workload to the features provided by the resource pools making up the software defined infrastructure. These features may include: proximity to a resource for performance, access to a resource constrained by license entitlement, and redundant connection to a resource.

The SDIM allocates the resources selected above to the newly defined SDI. This allocation marks the resources in use by a SDI and ensures that the resources are reserved for the newly defined SDI. The SDIM allows the user to allocate the SDI resources into a pool so that the aggregate resources in the pool can be collectively managed. The SDIM also provides metrics for the aggregate resources or pool of resources. For example, processor and memory metrics are provided to show the resources that are both allocated and available in the SDI. Metrics are provided for each physical server that is providing resources to the SDI, along with an aggregate view that shows both allocated and available resources across all physical servers backing the SDI. The SDI also manages the aggregate SDI resources.

Once the SDI is created and defined as described above, and the metrics for the aggregate set of resources are available so new workloads can be deployed into the SDI. The situation that the SDI is comprised of a subset of resources from multiple physical servers has been encapsulated from the workload deployment software such the deployment software is not aware of the fact that the compute resources allocated to the SDI are a subset of resources from one or more physical servers. This encapsulation allows the workload deployment and undeployment to this new SDI to be carried out in a fashion as known in the prior art using cloud deployment software. The SDIM then allows the administrator on an ongoing basis to manage the SDI resources. The SDIM allows ongoing management by allowing the administrator to allocate new resources to add capacity to the SDI or de-allocate resources from the SDI.

Figure 8:
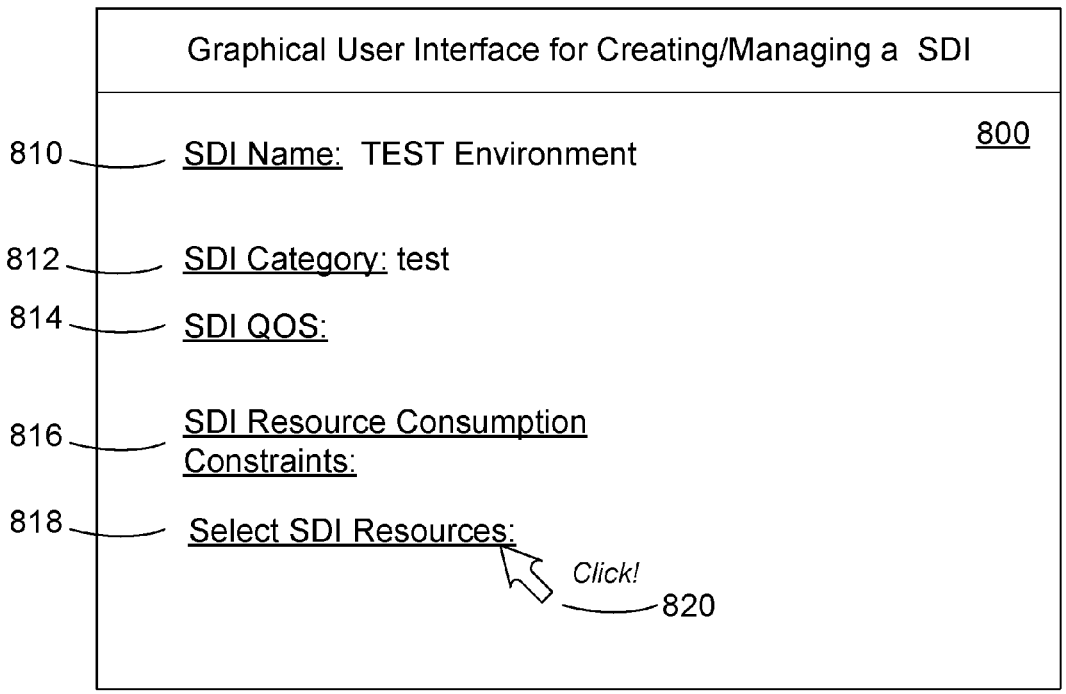
FIG. 8 is a diagram that represents a view screen of a simplified graphical user interface for creating and managing an SDI.

FIG. 8 is a diagram that represents a view screen of a simplified graphical user interface 800 of the SDIM for creating and managing an SDI as described above. The SDIM user interface 800 allows a user or administrator to specify a name 810 for the SDI. In this example, the administrator has selected the name "Test Environment" for the SDI. The SIM user interface 800 allows the administrator to set an SDI category 812. The SDI category may be implemented with a drop down selection box. In this example, the "test" category has been selected. The SDIM user interface 800 optionally allows the administrator to set SDI QOS parameters 814 and set SDI consumption constraints 816. The SDIM also allows the selection of SDI resources 818. Each of these selections by the administrator may result in a new screen of options for the administrator to complete the actions. For example, if the administrator selects "Select SDI Resources" by clicking 820 on the menu item 818 as shown, the administrator is shown a new menu of the graphical user interface as shown in FIG. 9.

Figure 9:
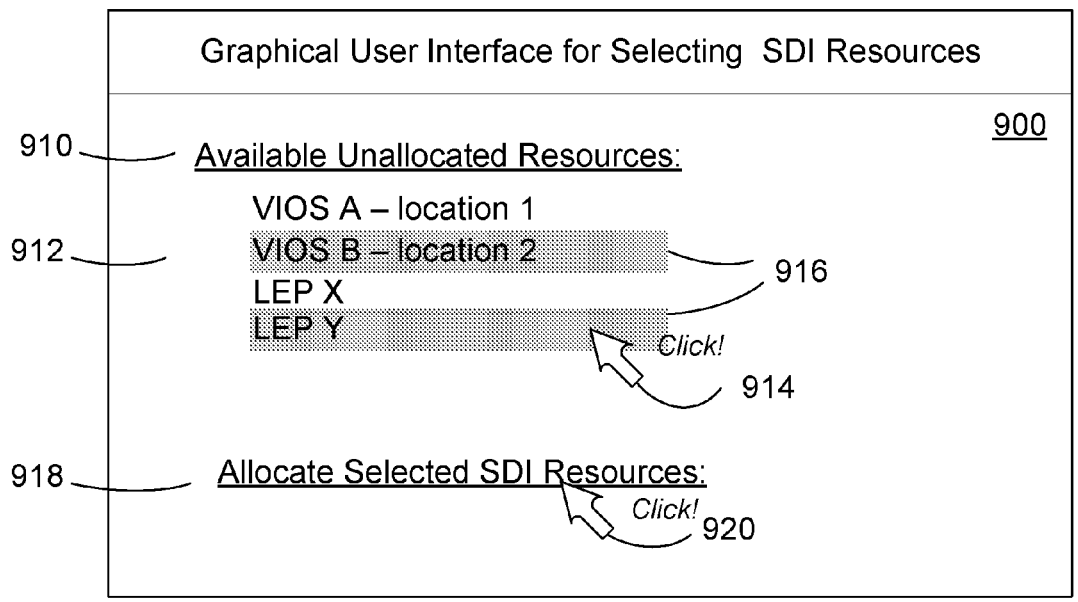
FIG. 9 is a diagram that represents a simplified graphical user interface for selecting and aggregating unallocated resources into an SDI.

FIG. 9 is a diagram that represents a view screen of a simplified graphical user interface 900 of the SDIM for allocating resources in a SDI. As discussed above, the graphical user interface 900 is displayed in response to an administrator clicking on "Select SDI Resources" on the menu item 818 in FIG. 8. The SDIM shows a heading of "Available Unallocated Resources" 910. The SDIM then determines available unallocated resources in the cloud and displays a list 912 of unallocated resources. The administrator may select one or more of the unallocated resources by clicking on them 914. The selected unallocated resources are shown with a highlighted text block 916. The administrator can then instruct the SDIM to allocate the selected (highlighted) resources 916 into the SDI by clicking 920 on the "Allocate Selected SDI Resources" button 918. Each of the unallocated resources are then included in the SDI resource.

The SDIM determines resources 912 that are unallocated and displays them as shown in FIG. 9. The unallocated resources 912 are portions of physical resources that can be virtually allocated to a SDI such that an application deployed to the SDI can use the resources. For example, if the admin selects one or more VIOS to be allocated to a SDI, then the storage and networks that are accessible via the selected virtual I/O servers become available to the SDI. Storage and networks that are not accessible (but may be accessible to other I/O servers on the physical server) are not available to the SDI. Likewise, if the admin selects a given LEP, then only the subset of processors on the physical server that carry the necessary software license entitlements (as defined by the LEP) are allocated to the SDI.

Figure 10:
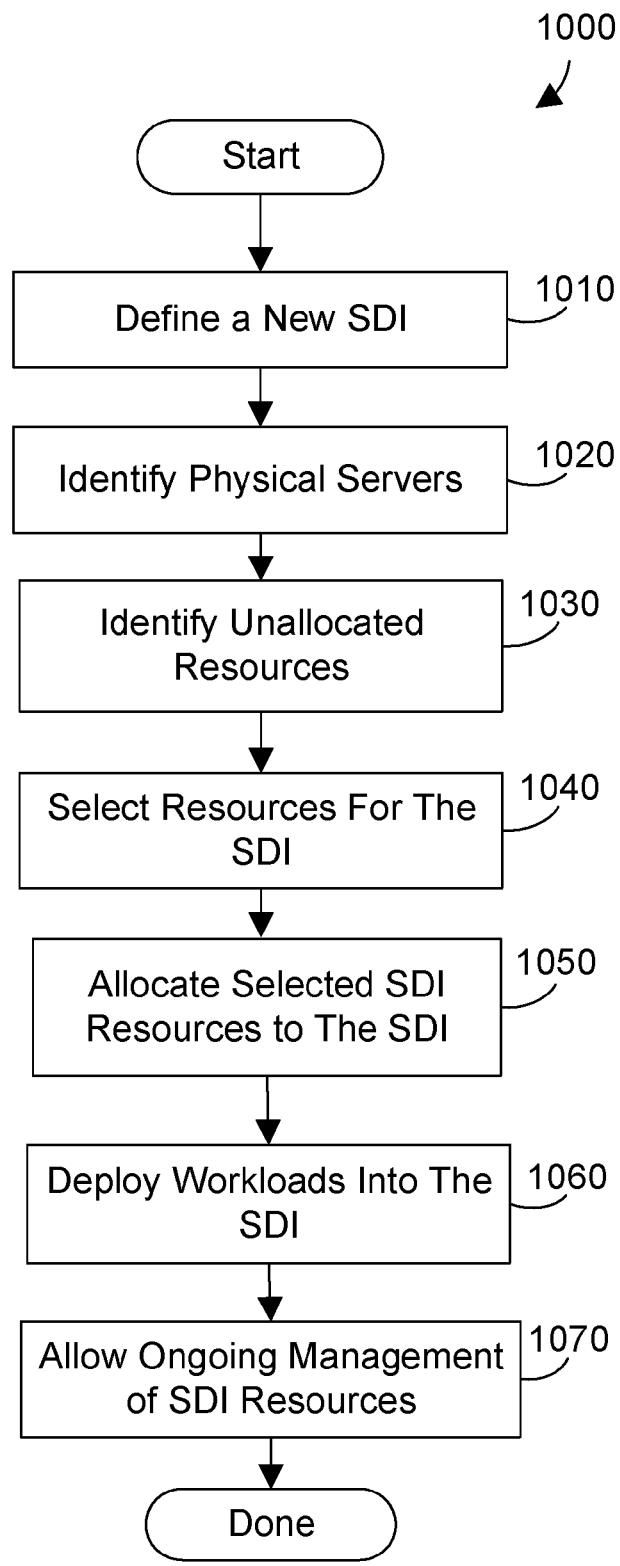
FIG. 10 is a flow diagram of a method for encapsulating a physical server's resources into multiple resource pools to be used by one or more workloads in a cloud environment.

Referring now to FIG. 10, a flow diagram shows method 1000 for an SDI mechanism that provides a software defined infrastructure as described and claimed herein. The method 1000 is presented as a series of steps performed by a computer software program described above as the SDI mechanism (SDIM) 350. Method 1000 performs the following steps to define a given SDI that is allocated a subset of resources from one or more physical servers. Define a new SDI to create an SDI (step 1010). Identify physical servers (step 1020). Identify unallocated resources (step 1030). Select resources for the SDI (step 1040). Allocate the selected resources to the SDI (step 1050). Deploy new workloads into the SDI (step 1060). Allow the administrator on an ongoing basis to manage the aggregate SDI resources in the SDI (step 1070). The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The claims and disclosure herein provide an apparatus and method for a software defined infrastructure (SDI) that provides a subset of a computer server's resources be available to a cloud solution or workload. Multiple subsets of resources can be combined in a SDI to provide a logical resource pool across multiple physical machines to allow cloud administrators to achieve greater utilization and optimization of physical server resources. Software defined environments as described herein can provide isolation of resources for specific workload needs such as development, operations, test and production. Using the SDIs provides an ability to manage service guarantees to core production applications while at the same time providing flexibility to allow non-core applications to utilize free resources. SDIs can allow support of multi-tenant environments via isolated logical resource pools independent of physical resource boundaries.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for creating and managing a software defined infrastructure (SDI), the method comprising:
    creating the SDI, wherein the SDI comprises a logical resource pool having resources from a plurality of physical servers including a subset of physical resources available from each of the plurality of physical servers to provide the logical resource pool to a workload in a cloud computing environment;
    identifying physical servers to provide compute resources to the SDI;
    identifying unallocated resources from the physical servers;
    selecting unallocated resources for the SDI from the identified unallocated resources;
    allocating at least one of the unallocated resources to the SDI; and
    wherein the logical resource pool comprises a plurality of license entitlement pools including at least one license entitlement pool from a plurality of physical servers where the at least one license entitlement pool from the plurality of physical servers comprises a subset of the license entitlement pools available on the physical server where the license entitlement pools of the physical server are divided into more than one SDI.

2. The method of claim 1 wherein the logical resource pool comprises at least one virtual input/output server (VIOS).

3. The method of claim 1 wherein the logical resource pool comprises a plurality of virtual input/output servers (VIOS) located on a plurality of physical servers.

4. The method of claim 1 further comprising deploying workloads to the SDI, wherein the workloads use the subset of resources.

5. The method of claim 4 wherein the subset of resources comprises at least one logical partition for provisioning client workloads.

6. The method of claim 5 wherein the logical partition is a dynamic logical partition that can be dynamically managed to meet a service level agreement.

7. The method of claim 1 wherein the SDI includes a definition that includes a name and metadata that defines SDI characteristics, wherein the metadata includes an SDI category, quality of service, and resource consumption constraints.

8. A computer-implemented method executed by at least one processor for creating and managing a software defined infrastructure (SDI), the method comprising:
- creating the SDI, wherein the SDI comprises a logical resource pool having resources from a plurality of physical servers including a subset of physical resources available from each of the plurality of physical servers to provide the logical resource pool to a workload in a cloud computing environment;
- identifying physical servers to provide compute resources to the SDI;
- identifying unallocated resources from the physical servers;
- selecting unallocated resources for the SDI from the identified unallocated resources;
- allocating at least one of the unallocated resources to the SDI;
- deploying workloads to the SDI, wherein the workloads use the subset of resources
- wherein the logical resource pool comprises a plurality of license entitlement pools including at least one license entitlement pool from a plurality of physical servers where the at least one license entitlement pool from the plurality of physical servers comprises a subset of the license entitlement pools available on the physical server where the license entitlement pools of the physical server are divided into more than one SDI; and
- wherein the SDI includes a definition that includes a name and metadata that defines SDI characteristics, wherein the metadata includes an SDI category, quality of service, and resource consumption constraints.

9. The method of claim 8 wherein the logical resource pool further comprises at least one virtual input/output server (VIOS).

10. The method of claim 8 wherein the logical resource pool further comprises a plurality of virtual input/output servers (VIOS) located on a plurality of physical servers.

11. The method of claim 8 wherein the subset of resources comprises at least one logical partition for provisioning client workloads.

12. The method of claim 8 wherein the logical partition is a dynamic logical partition that can be dynamically managed to meet a service level agreement.

13. A computer-implemented method executed by at least one processor for creating and managing a software defined infrastructure (SDI), the method comprising:
- creating the SDI, wherein the SDI comprises a logical resource pool having resources from a plurality of physical servers including a subset of physical resources available from each of the plurality of physical servers to provide the logical resource pool to a workload in a cloud computing environment;
- identifying physical servers to provide compute resources to the SDI;
- identifying unallocated resources from the physical servers;
- selecting unallocated resources for the SDI from the identified unallocated resources;
- allocating at least one of the unallocated resources to the SDI;
- deploying workloads to the SDI, wherein the workloads use the subset of resources;
- wherein the logical resource pool comprises a plurality of license entitlement pools including at least one license entitlement pool from a plurality of physical servers where the at least one license entitlement pool from the plurality of physical servers comprises a subset of the license entitlement pools available on the physical server where the license entitlement pools of the physical server are divided into more than one SDI;
- wherein the SDI includes a definition that includes a name and metadata that defines SDI characteristics, wherein the metadata includes an SDI category, quality of service, and resource consumption constraints; and
- wherein the logical resource pool further comprises at least one virtual input/output server (VIOS).

14. The method of claim 13 wherein the logical resource pool further comprises a plurality of virtual input/output servers (VIOS) located on a plurality of physical servers.

15. The method of claim 13 wherein the subset of resources comprises at least one logical partition for provisioning client workloads.

16. The method of claim 15 wherein the logical partition is a dynamic logical partition that can be dynamically managed to meet a service level agreement.

* * * * *